United States Patent
Athanas et al.

(10) Patent No.: US 6,973,516 B1
(45) Date of Patent: Dec. 6, 2005

(54) METHOD AND APPARATUS FOR A CONTROLLER CAPABLE OF SUPPORTING MULTIPLE PROTOCOLS

(75) Inventors: Peter M. Athanas, Newport, VA (US); Paul D. McFall, Blacksburg, VA (US)

(73) Assignee: Intransa, Inc., San Jose, CA (US)

( * ) Notice: Subject to any disclaimer, the term of this patent is extended or adjusted under 35 U.S.C. 154(b) by 407 days.

(21) Appl. No.: 10/152,663

(22) Filed: May 20, 2002

(51) Int. Cl.[7] .................. G06F 13/00; G06F 13/14
(52) U.S. Cl. ............... 710/100; 710/305; 710/313; 710/33
(58) Field of Search ............... 710/100, 305, 710/313–315, 33

(56) References Cited

U.S. PATENT DOCUMENTS

| | | | |
|---|---|---|---|
| 5,524,268 A * | 6/1996 | Geldman et al. ............... 710/5 |
| 6,115,772 A * | 9/2000 | Crater ........................... 710/306 |
| 6,222,855 B1 * | 4/2001 | Kimber et al. ................ 370/466 |
| 6,499,073 B1 * | 12/2002 | Wallach et al. ............... 713/340 |
| 6,557,049 B1 * | 4/2003 | Maloy et al. ................... 710/8 |
| 6,708,239 B1 * | 3/2004 | Ellerbrock et al. ............ 710/62 |
| 6,779,052 B2 * | 8/2004 | Hatano .......................... 710/33 |

* cited by examiner

Primary Examiner—Tim Vo
(74) Attorney, Agent, or Firm—Dorsey & Whitney LLP

(57) ABSTRACT

The present invention provides a controller system including a common controller, a first interface, a second interface, and an adapter. The first interface is used to receive and to send data according to a first protocol having a format useable by a computer system. The common controller is coupled between the first interface and the second interface to translate between the first protocol and the second protocol, the second protocol is used by a memory coupled to the common controller. The second interface is used to store and to retrieve data from the memory according to the second protocol. The adapter function can be coupled between the memory and the common controller. The memory forms a response to a request by the computer system, with the response including at least one of (A) storing information, (B) retrieving information, and (C) providing status information.

25 Claims, 5 Drawing Sheets

METHOD AND APPARATUS FOR A CONTROLLER CAPABLE OF SUPPORTING MULTIPLE PROTOCOLS

FIELD OF THE INVENTION

The present invention is applicable to the field of controllers coupled with storage devices such as magnetic hard disks and more specifically to a controller capable of supporting multiple protocols.

BACKGROUND OF THE INVENTION

A computer system can be coupled to a controller using an interface, such as a bus, which provides a transmission path for communication between the computer system and a device. Communication is generally defined by a specific protocol and a transmission rate, which may be described as megabytes per second (MBps). For example ISA (Industry Standard Architecture) is a standard bus (computer interconnection) architecture that is associated with the IBM AT motherboard. ISA provides a transmission path that supports communication using 16 bits of information flowing between the motherboard and a card, such as a controller card, and its associated device(s), e.g., a disk drive. EISA is another standard bus architecture that extends the ISA standard to a 32-bit interface. Another example is PCI (Peripheral Component Interconnect), which is an interconnection system between a processor and attached devices. A number of other interfaces are known in the art to support coupling a computer system and a controller.

A protocol provides a set of rules that support communication between two systems, such as a computer system and a device. Protocols may exist at several levels including Transmission Control Protocol (TCP) and Internet Protocol (IP), better known as a TCP/IP protocol. IP uses a set of rules to send and receive messages at a Internet address level. Additional protocols may be packaged with a TCP/IP protocol including the Hypertext Transfer Protocol (HTTP) and File Transfer Protocol (FTP), with each protocol defining a sets of rules for communicating between the two systems. Both systems must recognize and observe the protocol. TCP uses a set of rules to exchange messages with other systems at a information packet level. A variety of other communication protocols are known.

Storage devices support storing information and data, and may include magnetic storage, optical storage, solid state storage. A variety of interfaces and protocols are known to support coupling a computer system with storage devices. Several types of interfaces include ATA (Advanced Technology Attachment) and SCSI (Small Computer System Interface). The protocol used for communication is generally dictated by the type of interface, such that the interface and protocol may be specifically designed for use with specific devices. For example, an ATA disk drives use an ATA interface and a corresponding ATA protocol. Similarly a SCSI disk drive uses a SCSI bus or interface cable and a SCSI protocol.

Improvements in device technology have resulted in a wide variety of storage devices that typically require a specific interface, a specific protocol, and a specific data transmission rate for sending information using the interface. For example, SCSI devices include a number of variants that require different types of buses and different protocol. SCSI-1 requires an 8-bit interface or bus and supports data rates of 4 MBps. SCSI-2 which is similar to SCSI-1 but uses a 50-pin connector instead of a 25-pin connector, and supports multiple devices. Wide SCSI uses a wider cable (168 cable lines to 68 pins) to support 16-bit transfers. Fast SCSI uses an 8-bit bus but doubles the clock rate to support data rates of 10 MBps. Fast Wide SCSI uses a 16-bit bus and supports data rates of 20 MBps. Ultra SCSI uses an 8-bit bus and supports data rates of 20 MBps. SCSI-3 uses a 16-bit bus and supports data rates of 40 MBps. Ultra2 SCSI uses an 8-bit bus and supports data rates of 40 MBps. Wide Ultra2 SCSI uses a 16-bit bus and supports data rates of 80 MBps. Each SCSI device typically requires a specially designed bus and/or a specially designed protocol. Further, fibre channel technology was designed to interoperate with SCSI, IP, and other protocols. However this technology presents compatibility issues primarily because manufacturers sometimes interpret specifications differently and vary their implementations.

A controller is used to support communication between a computer system and a device and typically includes a processor and associated circuitry or programs. The controller is coupled with the computer system with a first interface, e.g., ISA, EISA, PCI, to support communication according to a first protocol, e.g., TCP/IP. The controller is coupled with the device with a second interface, e.g., IDE, SCSI I, to support communication according to a second protocol. Controllers are designed to communicate with specific devices according to a specific interface and specific protocol. Replacing or upgrading devices typically involves an improved interface or protocol, and consequently requires replacing the controller and all associated devices. For example, an IDE controller provides support for an IDE bus and an IDE protocol, likewise a SCSI I controller provides support for a SCSI I bus and a SCSI I protocol. IDE devices can not be used with an SCSI I controller, and vice versa. Unfortunately, controllers are designed to support a specific interface and a specific protocol.

Cables support communication between a controller and the corresponding memory but typically are dedicated to supporting a specific protocol. For example, an IDE controller requires and IDE cable to communicate with an IDE disk drive.

One type of controller supports a Redundant Array of Independent (or Inexpensive) Disks (RAID) to provide a way of combining multiple physical devices into a single logical device. Two or more physical disk drives may be logically combined as a single logical disk drive to enhance fault tolerance and performance. RAID controllers are readily available to support specific ATA disk drives or specific SCSI disk drives. Current RAID controllers support a specific interface and a specific protocol. Unfortunately, current controllers are not robust enough to support combining different types of physical disk drives, which may require different specific interfaces and specific protocols. Accordingly, a variety of disk drives can not be used to creates a logical drive with existing RAID controllers.

A SCSI RAID controller depicted in FIG. 1 includes a first interface, which supports a first protocol (not shown) to support communication with a computer system 10. The SCSI controller 20 includes a second interface 30 such as a SCSI I bus. SCSI I Disk drives 40-1, . . . , 40-N, can be coupled to the second interface 30. Communication between the SCSI controller 20 and the disk drives 40-x is supported by a second protocol, which uses the second interface 30. A variety of SCSI disk drives are commercially available but unfortunately the SCSI controller 20 only supports communication with specific SCSI devices according to a specific interface and a specific protocol. Using new technology generally results in the replacement of the SCSI controller 20 and all devices 40-x with the newer technology. For example, SCSI II disk drives require a SCSI II controller, a SCSI II interface, and a SCSI II protocol.

A second computer system 50 depicted in FIG. 1 includes a first interface, which supports a first protocol (not shown) to support communication with a computer system 50. The ATA controller 60 includes a second interface 70 such as a IDE bus. IDE Disk drives 80-1 and 80-2 can be coupled to the second interface 70-1. According to this implementation each ATA interface 70-1, 70-2, may be coupled to a maximum of two IDE disk drives 80-1 and 80-2. Communication between the ATA controller 60 and the disk drives 80-x is supported by a second protocol, which uses the second interface 70-x. A variety of ATA disk drives are commercially available but the ATA controller 60 typically only supports communication with specific ATA devices according to a specific interface and a specific protocol. Again some controllers may provide limited backward compatibility to support accessing older ATA devices, but upgrading the devices typically requires replacing the controller and all disk drives.

A so-called Firewire controller depicted in FIG. 2 includes a first interface, which supports a first protocol (not shown) to support communication with a computer system 90. The Firewire controller 100 includes a second interface 110 such as a Firewire interface. Firewire disk drives 120-1, . . . , 120-N, can be coupled to the second interface 110. Communication between the Firewire controller 100 and the disk drives 120-x is supported by a second protocol, which uses the second interface 110. Unfortunately the Firewire controller suffers similar shortcomings of requiring a specific Firewire controller, Firewire bus, and Firewire protocol.

As noted, prior art controllers support a single interface and a corresponding protocol to communicate with attached devices. Further, special controllers such as a RAID controller also require the use of a specific interface and protocol. Ideally, a controller would be capable of accessing devices according to a variety of interfaces and protocols.

Thus, there is a need for a controller and a modular method for transparently supporting multiple devices, each of which may require a specific interfaces and protocol. Additionally, such a controller and method should efficiently support communication between a computer system and a variety of devices. Preferably such controller and method should be implementable as a common controller whose internal architecture is transparent to the computer system and a variety of devices. Stated differently, such a common controller should transparently enable storage via a variety of interfaces (conventional or otherwise) and protocols such as SCSI I interface and a SCSI I protocol, or an IDE interface and an IDE protocol.

The present invention provides such a common controller and method of combining multiple disk drives.

SUMMARY OF THE INVENTION

The present invention provides a controller system including a common controller, a first interface, a second interface, and an adapter. The first interface is used to receive and to send data according to a first protocol having a format useable by a computer system. The common controller is coupled between the first interface and the second interface to translate between the first protocol and the second protocol, the second protocol is used by a memory coupled to the common controller. The second interface is used to store and to retrieve data from the memory according to the second protocol. The adapter function can be coupled between the memory and the common controller. The memory forms a response to a request by the computer system, with the response including at least one of (A) storing information, (B) retrieving information, and (C) providing status information.

Other features and advantages of the invention will appear from the following description in which the preferred embodiments have been set forth in detail, in conjunction with the accompanying drawings.

DETAILED DESCRIPTION OF THE INVENTION

Before describing FIGS. 3–6, some definitions pertaining to the present invention will be given. An interface supports communication between two systems as described above. The term interface is broadly used to describe interaction or communication between at least two systems, and the terms first interface and second interface are used herein. Several first interfaces include without limitation a PCI bus, an ISA bus, an Ethernet bus, a SCSI bus, and a USB bus. Several exemplary second interfaces include a SCSI interface, an ATA interface, a Firewire interface, and a USB interface. A protocol supports communication between two systems, and the term protocol is broadly used to describe any protocol that supports communication. Several exemplary protocols include without limitation a SCSI protocol, an ATA protocol, a Firewire protocol, and USB protocol.

Figure 1:
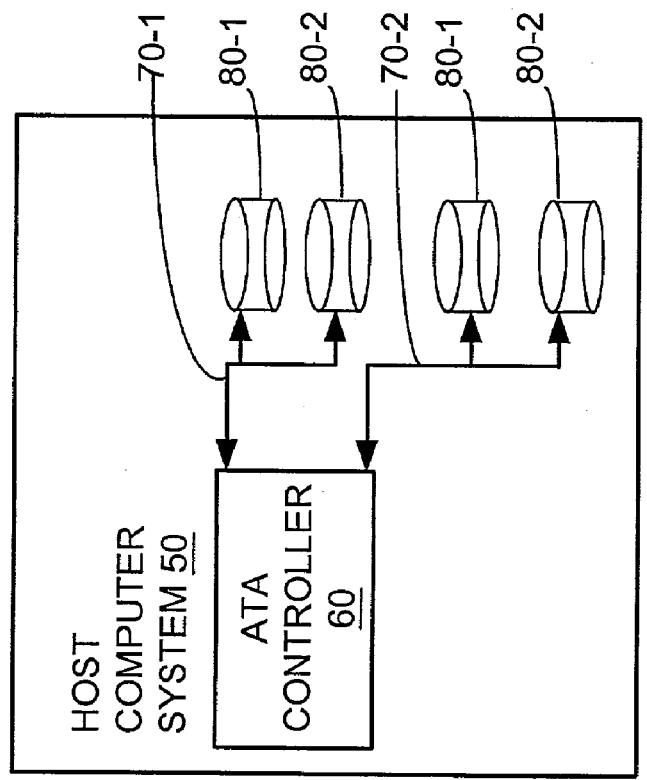
FIG. 1 generally depicts coupling a SCSI controller to SCSI disk drives, and coupling an ATA controller to ATA disk drives, according to the prior art.
Figure 1:
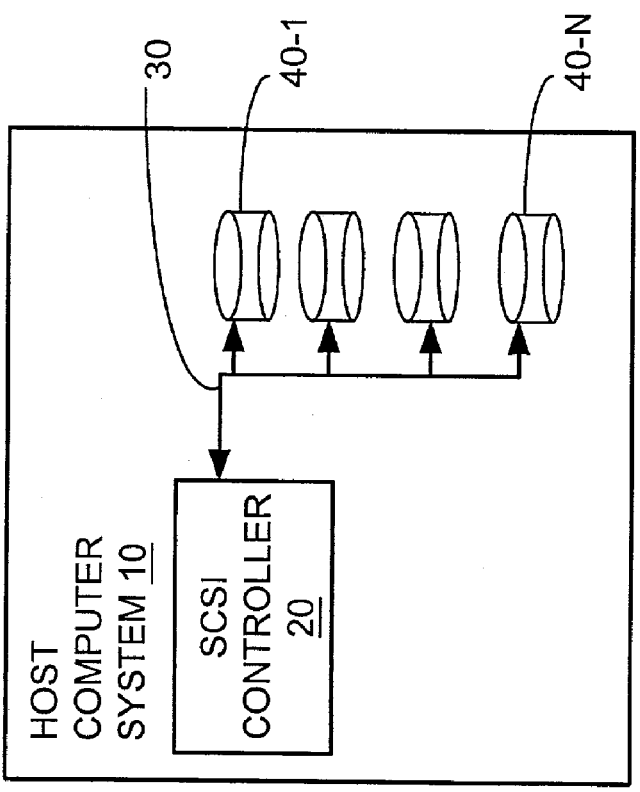
Figure 2:
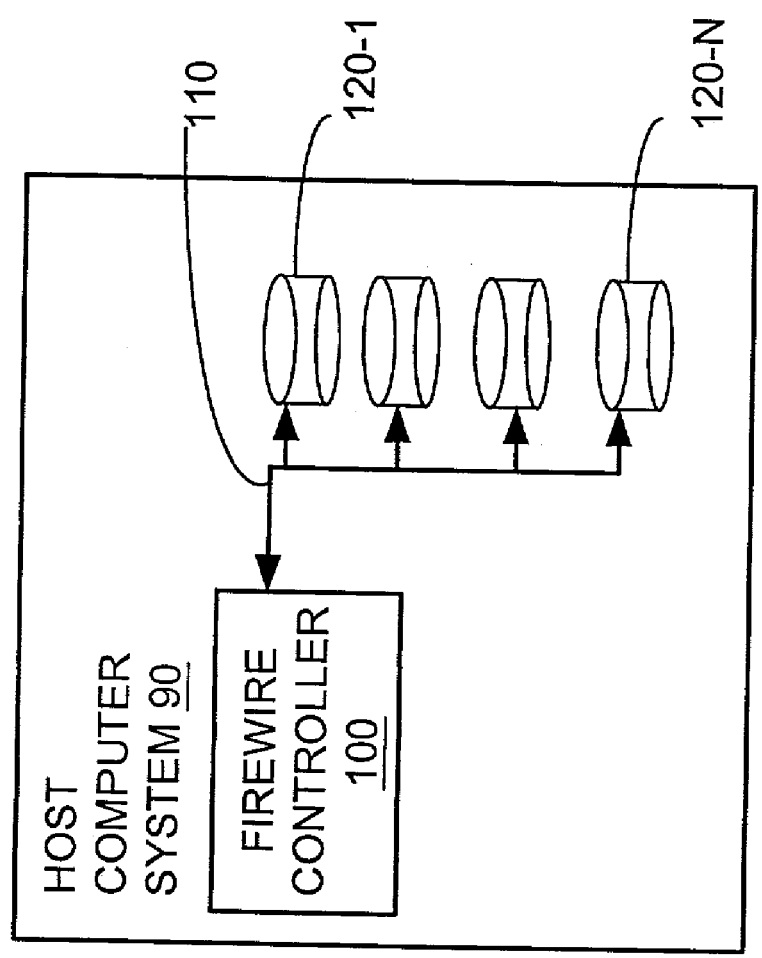
FIG. 2 generally depicts coupling a Firewire controller to Firewire disk drives, according to the prior art.
Figure 3:
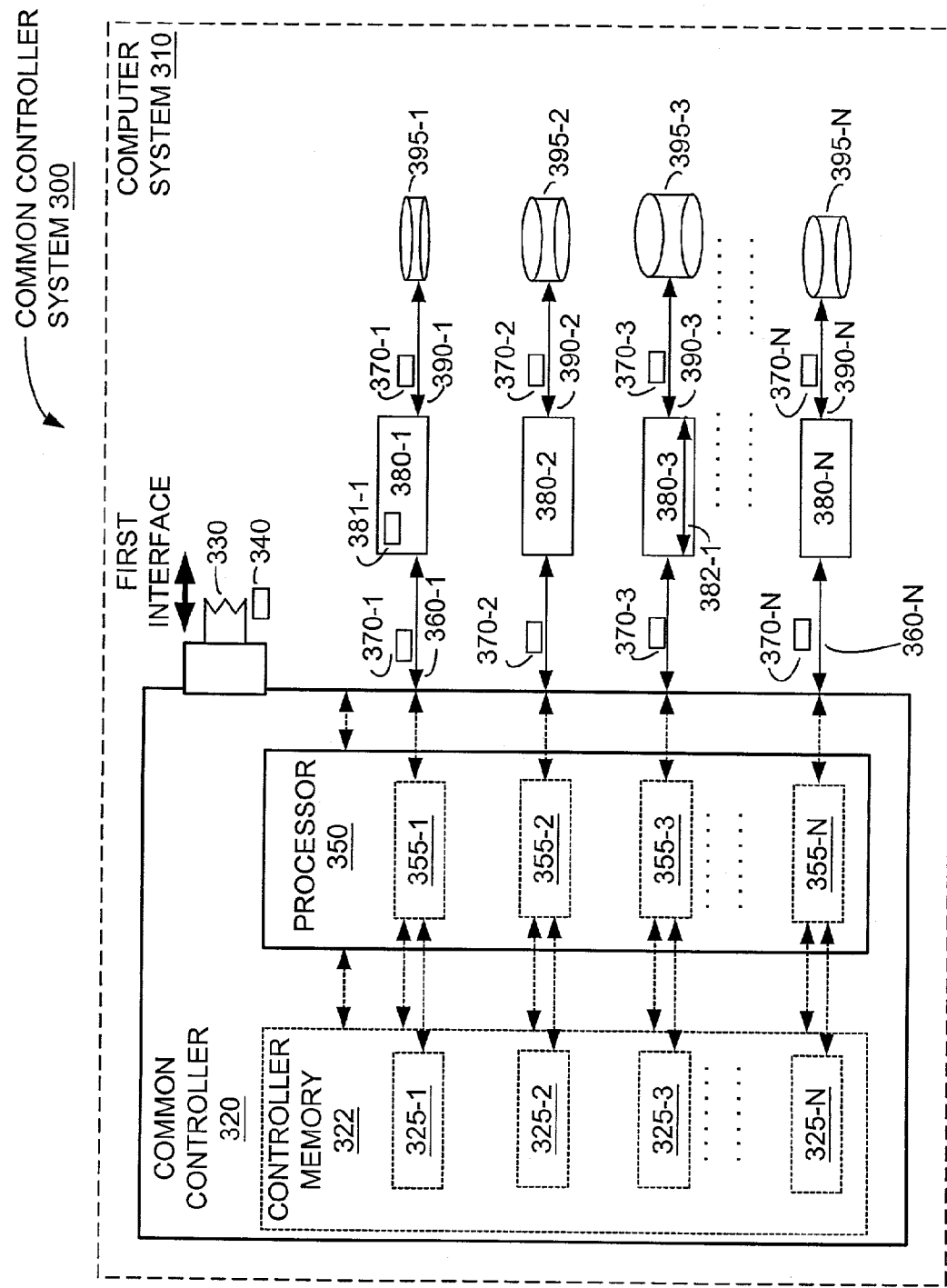
FIG. 3 depicts a common controller coupled with disk drives without restriction to a specific interface and protocol, according to the present invention.

The present invention provides a modular controller system and method for controlling devices that may require different interfaces and protocols. FIG. 3 depicts a common controller system 300, according to the present invention, coupled with a computer system 310. Controller system 300 includes a common controller 320, a first interface 330, a first protocol 340, a processor 350, a second interface 360-x, and a second protocol 370-x, an adapter 380-x, a third interface 390-x, and a device 395-x. The common controller is configured to receive and to send information to the computer system 310 using a first interface 330 that uses a first protocol 340, which is in a format usable by a computer system 310. The device 395-x is configured to store and retrieve data according to the second protocol.

The adapter 380-x supports communication between the common controller 320 and the memory 395-x. This can be accomplished by at least one of (a) coupling the second interface 360-x and the third interface 390-x, and (b) identifying the second protocol 370-x. The adapter 380-x may be coupled with an adapter memory, e.g., 381-1, to identify the second protocol 370-1. The identity of the second protocol may be communicated to the common controller 320 using the second interface, 360-$x$. The common controller may use a default second protocol 370-$x$ if the adapter 380-$x$ does not identify or communicate a second protocol. The adapter provide a direct communication between the second interface 360-$x$ and the third interface 390-$x$ as depicted by 382-1.

The adapter 380-$x$ may support communication between the common controller 320 and the memory 395-$x$ using a first coupling between the common controller 320 and the adapter 380-$x$, and a second coupling between the adapter 380-$x$ and the memory 395-$x$. The adapter may couple the first coupling to the second coupling to support communication between the common controller and the memory. The adapter is typically capable of identifying the second protocol, where the identity of the second protocol may be stored with the adapter 380-$x$ and communicated to the common controller 320.

A first connector may be coupled between the common controller 320 and the adapter 380-$x$, to provide a second interface 360-$x$. A second connector may be coupled between the adapter 380-$x$ and the memory 395-$x$, to provide a third interface 390-$x$. The first connector may be a first cable and the second connector may be a second cable. The adapter may couple to common controller and the memory to support communication between the common controller and the memory. Alternatively, the adapter may couple the first cable to the second cable to support communication between the common controller and the memory. The first cable may include a plurality of electrical paths used to support multiple protocols, including paths allocated to identifying the second protocol. Electrical paths may be used by the adapter to identify the second protocol, and may simply be passive wires coupled in a predetermined order to signify the second protocol. For example, if three electrical paths are used, the first path may be coupled to the second path to indicate the second protocol is an ATA protocol. Alternatively the first path may be coupled to the third path to indicate a the second protocol is a SCSI protocol. Other approaches to identify the second protocol may of course be used.

The common controller, adapter, and device may be disposed within a computer system or perhaps be remotely disposed. The device 395-$x$ can form a response to a request from the computer system, including storing information, retrieving information, and providing status information. The second protocol may support communication with standard memory devices including ATA, SCSI, USB, USB-2, Firewire, and other devices capable of storing and/or retrieving information. The device 395-$x$ may include memory, which may include persistent storage or non-volatile storage, or volatile storage. In one embodiment, the device 395-$x$ is persistent memory, such as a disk drive.

An interface between the common controller 320 and the device 395-$x$ is provided by the second interface 360-$x$ and a third interface 390- $x$. The protocol used to communication between the common controller 320 and the device 395-$x$ is identified by the adapter 380-$x$. In one embodiment the second interface 360 may support at least one protocol 370-$x$. Multiple interfaces and protocols may be supported by a single second interface 360-$x$. The second interface 360-$x$ may be capable of supporting IDE and SCSI I interface and protocol.

The memory 395-$x$ may include a wide variety of memories currently available and those which will be developed as technology improves. Without limitation, current types of memory include ATA disk drives, SCSI disk drives, Firewire disk drives, USB disk drives, Fibre Channel Arbitrated Loop disk drives, various other hard disk drives, solid state memory, and optical storage, to name a few. Other types of memory devices and/or systems may be used for the memory.

The protocol used for communication between the common controller 320 and a device 395-$x$ may be supported by instructions, program, and/or circuitry coupled with the common controller 320. In one embodiment, memory 322 is coupled with the common controller 320 to store instructions for supporting the communication protocol. Once the communication protocol 370-$x$ is identified, the processor 350 may communicate with the device using the instructions stored in memory 322.

Instructions to communicate according to multiple protocols 322-1, . . . , 322-N, may be stored in the memory 322. In a preferred embodiment, instructions to communicate according to at least IDE, and SCSI I protocols are supported by the common controller.

Processor 350 be coupled with additional processors to support interaction between common controller 320 and the devices 395-$x$. In one embodiment, a processor 355-$x$, provides support for communication between the common controller 320 and at least one device 395-$x$ according to a protocol 370-$x$.

One or more devices 395-1, 395-2 . . . , 395-N can be coupled independently of each other to the common controller 320. Each device 395-$x$ may require a specific communication protocol 370-$x$. Additional interfaces may be developed to couple new devices to a common controller 320. Additional protocols may also be supported by adding instructions to the common controller 320. A variety of devices may thereby be supported by the present invention, which provides for dynamically retrofitting the common controller to provide support. The present invention can communicate with such devices, in contrast to prior art systems.

According to one embodiment, the common controller 320 supports RAID functionality, such as organizing at least one physical device 395-$x$ as a logical device. RAID Instructions may be stored in the memory 322 to support the logical representation of multiple physical device independently of the protocols required for communication between the common controller and the devices 395-$x$ associated with the RAID functionality. RAID operations can be optimized based on the data rates supported by at least one device 395-$x$.

Figure 4:
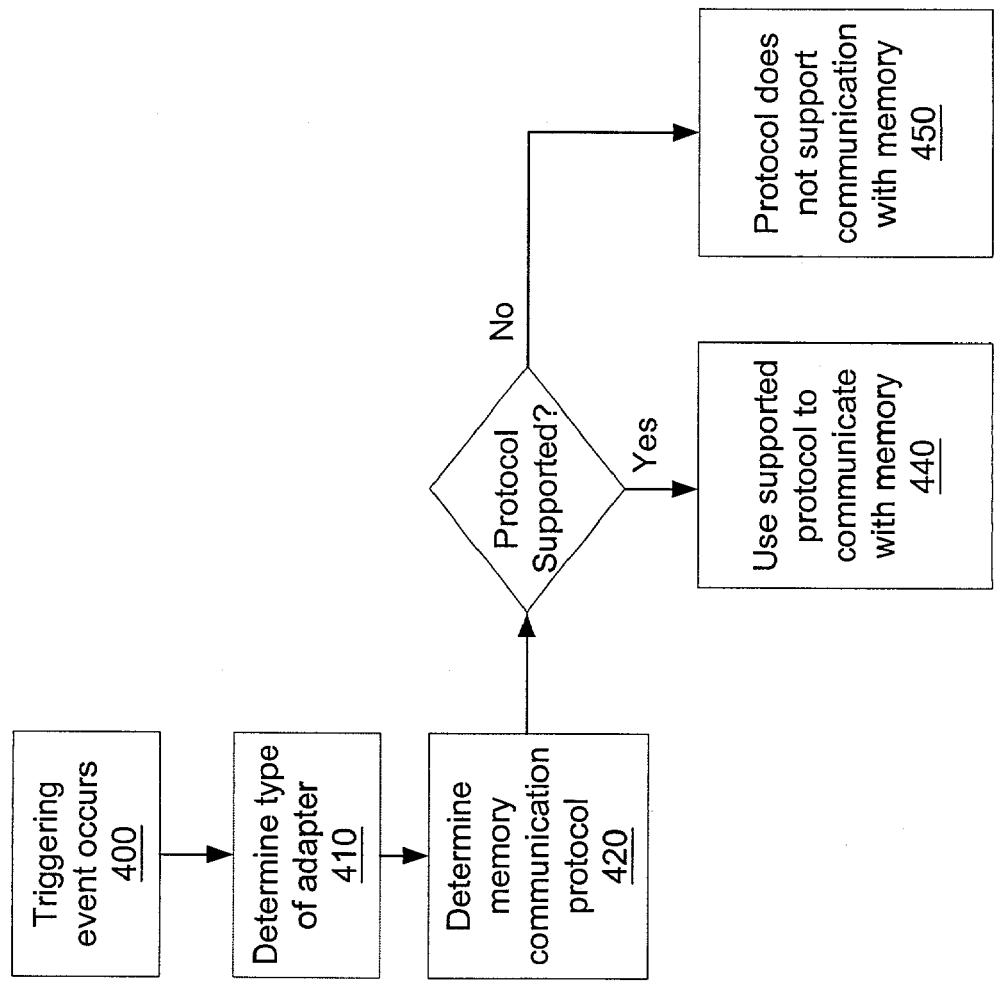
FIG. 4 depicts a process of determining if a device is coupled to a common controller, according to the present invention.

FIG. 4 depicts a process of determining if a device is coupled to a common controller. A triggering event at step 400 may occur in a variety of situations including 1) the common controller determining the state of an adapter or device has changed, 2) the computer system initiating a triggering event, 3) a device initiating a triggering event, or 4) an external event occuring, such as a power failure, timeout, failed communication, etc. The triggering event at step 400 may be specific to a specific interface, 330, 360-$x$, to a single protocol 340, 370-$x$, or to some combination thereof. After a triggering event, the common controller may determine the type of adapter at step 410 associated with at least one second interface 360-$x$. The protocol 370-$x$ is then determined based on the type of adapter identified at step 410 and/or using a default communication protocol (if a default protocol is used, the adapter need not identify the second protocol). If the determined protocol is supported, the common controller 320 may begin to communicate, at step 440, with the device 395-x according to the second protocol 370-x. If the determined protocol is not supported, at step 450, the common controller 320 may report an error message to the computer system 310.

Figure 5:
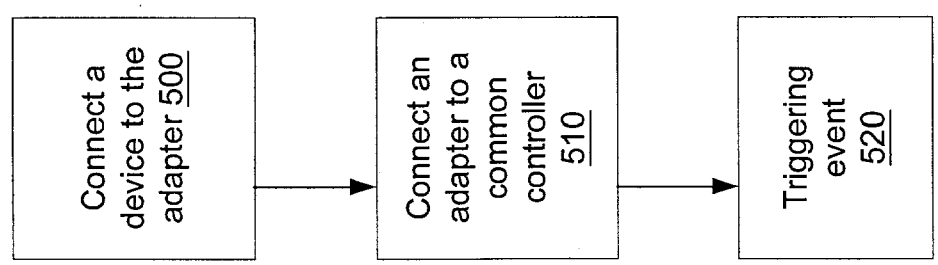
FIG. 5 depicts a process of coupling a device to a common controller.

FIG. 5 depicts a method or process of coupling a device to a common controller. A user may couple a device 395-x to an adapter (380-x) at step 500, which may be coupled to a common controller (320) at step 510. A trigger event at step 520 may then result in processing as described for FIG. 4.

Figure 6:
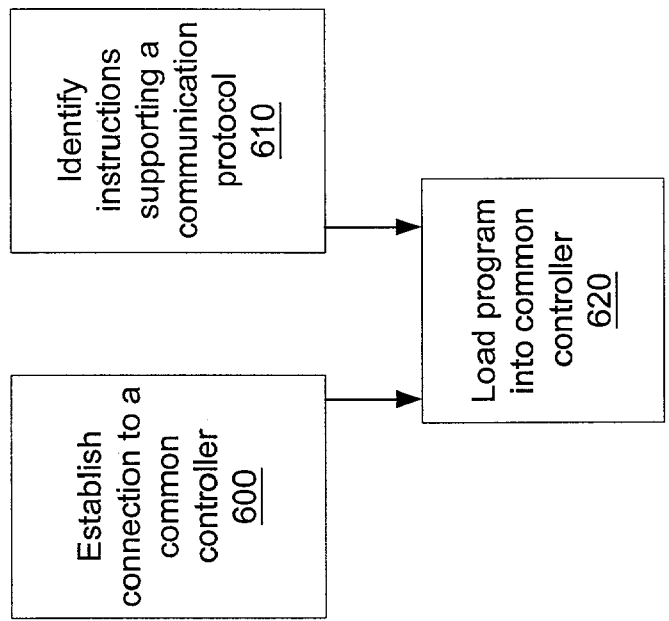
FIG. 6 depicts a process of adding additional functionality or instructions to a common controller, according to the present invention.

FIG. 6 depicts a method or process of adding additional functionality or instructions to a common controller. A coupling with the common controller needs to be established at step 600. Instructions supporting a communication protocol are identified at step 610. The instructions may be developed to support a variety of protocols and devices. The identified instructions can then be loaded at step 620 into the memory 322, which is coupled with the common controller 320.

According to one embodiment, the controller system 300 includes a common controller, a first interface, a second interface, and an adapter. The common controller 320 is coupled between the first interface and the second interface to translate between said first protocol and said second protocol. The first interface 330 receives and to sends data according to a first protocol 340 having a format useable by a computer system. The second interface stores and to retrieves data according to the second protocol having a format usable by a memory. The adapter 380-x couples the common controller and the memory 395-x, which forms a response to a request by a computer system, The memory response may include at least one of storing information, retrieving information, and providing status information.

The first cable may support a SCSI interface and a SCSI protocol, and can support an ATA interface and an ATA protocol, with the second cable supporting a second protocol supported by the first cable, such as a SCSI protocol or an ATA protocol. The first cable typically facilitates communication between the second interface and the adapter according to at least one protocol. The second cable typically facilitates communication between the adapter and the memory according to the second protocol selected. The first cable may support a SCSI interface and protocol, and an ATA interface and protocol, with the second cable supporting the second interface and protocol associated with either SCSI or ATA.

A processor is typically coupled with the first interface and/or the second interface. The processor may identify the second protocol through communication with the adapter, and typically the processor supports the translation between the first protocol and the second protocol. A memory may be coupled with the processor and may support translation between the first protocol and the second protocol. Communication with the computer system will be according to the first protocol, and communication with the memory will be according to the second protocol, and/or RAID functionality. RAID functionality is generally known and therefore not described in detail herein.

Additional processors may be coupled with the processor, and/or at least one second interface. Additional processors may support communicating with at least one device, and may support communication between the first interface and a second interface. The second processor may be coupled with a second interface to support communicating with the corresponding device according to the second protocol. A memory may be coupled with a processor to provide specific instructions for communicating with the device according to the second protocol, and supporting additional functionality such as RAID functionality.

A controller system may include a first interface to receive and to send data according to a first protocol having a format useable by a computer system. The controller system optionally includes a persistent memory requiring a second protocol to communicate. The controller system optionally includes an adapter functionally coupled to the memory. The controller system may include a second interface to store and to retrieve data according to the second protocol, which may include one or more protocols such as SCSI, ATA, Firewire, and USB. The controller system may include a controller memory having at least one instruction to support communication with the memory according to the second protocol. The controller system may include a processor coupled with the first interface, the second interface, and the controller memory. An adapter may be used to identity of the second protocol. The processor typically translates between the first protocol and the second protocol. A first cable may be used to support communication between the second interface and the adapter according to at least one protocol such as SCSI, ATA, Firewire or USB. A second cable may be used to support communication between the adapter and the memory according to the second protocol, such as SCSI, ATA, Firewire or USB. The memory forms a response to requests by the computer system, the memory response include at least one of storing information, retrieving information, and providing status information.

An adapter system may include a first adapter interface to receive and to send data according to at least one protocol and a second adapter interface to receive and to send data according to a second protocol. The first adapter interface may be coupled with the second interface, and the second adapter interface may be coupled to a memory 395-x. The adapter system typically communicates using the second protocol via the first adapter interface, and the adapter supports communication between the first adapter interface and the second adapter interface using the second protocol.

The foregoing descriptions of specific embodiments and best mode of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A controller system for use with a computer system, comprising:
   a common controller;
   a first interface to receive and to send data according to a first protocol having a format useable by the computer system, said first protocol being an Ethernet protocol;
   a memory requiring a second protocol to communicate;
   an adapter functionally coupled to said memory and said common controller; and
   a second interface to store and to retrieve data according to the second protocol, wherein the common controller is coupled between said first interface and said second interface to translate between said first protocol and said second protocol; and said memory forms a response to a request by said computer system, said response including at least one of (A) storing information, (B) retrieving information, and (C) providing status information.

2. The controller system of claim 1, wherein said memory includes at least one memory selected from a group consisting of (a) an ATA disk drive, (b) a SCSI disk drive, (c) a Firewire disk drive, (d) a USB disk drive, (e) a Fibre Channel Arbitrated Loop disk drive, (f) a hard disk drive, (g) solid state memory, and (h) optical storage.

3. The controller system of claim 1, wherein said memory is persistent memory.

4. The controller system of claim 1, wherein said second interface includes at least one interface selected from a group consisting of (a) SCSI bus, (b) ATA bus, (c) Firewire bus, and (d) USB bus.

5. The controller system of claim 1, wherein said second protocol includes at least one protocol selected from a group consisting of (a) SCSI protocol, (b) ATA protocol, (c) Firewire protocol, and (d) USB protocol.

6. The controller system of claim 1, wherein said adapter is coupled between said second interface and said memory.

7. The controller system of claim 1, wherein said adapter includes:
a first cable coupled between said second interface and said adapter; and
a second cable coupled between said adapter and said memory.

8. The controller system of claim 1, further including at least one of:
(1) a first connector that facilitates communication between said second interface and said adapter according to at least one protocol selected from a group consisting of (a) SCSI protocol, (b) ATA protocol, (c) Firewire protocol, and (d) USB protocol; and
(2) a second connector that facilitates communication between said adapter and said memory according to said second protocol selected from a group consisting of (aa) SCSI protocol, (bb) ATA protocol, (cc) Firewire protocol, and (dd) USB protocol.

9. The controller system of claim 1, further including a processor coupled with said first interface, and said second interface.

10. The controller system of claim 7, wherein said adapter couples said first cable to said second cable to support communication between said second interface and said memory.

11. The controller system of claim 7, wherein said first cable supports at least one of (a) SCSI interface and a SCSI protocol, and (b) an ATA interface and an ATA protocol; and said second cable supports a second protocol selected from a group consisting of (1) SCSI protocol, and (2) ATA protocol.

12. The controller system of claim 8, wherein said first connector is a first cable, and said second connector is a second cable.

13. The controller system of claim 9, wherein said processor is coupled with a controller memory.

14. The controller system of claim 9, wherein said adapter identifies said second protocol, and said processor translates between said first protocol and said second protocol.

15. The controller system of claim 9, wherein said processor further includes at least one second processor coupled with at least one second interface to support said second protocol.

16. The controller system of claim 13, wherein said controller memory includes at least one instruction that supports at least one of:
(1) communication with said computer system according to said first protocol;
(2) communication with said memory according to said second protocol; and
(3) RAID functionality.

17. A controller system for use with a computer system, comprising:
a first interface to receive and to send data according to a first protocol having a format useable by the computer system;
a first persistent memory requiring a second protocol to communicate;
a second persistent memory requiring a third protocol to communicate;
a first adapter functionally coupled to said first persistent memory;
a second adapter functionally coupled to said second persistent memory;
a second interface to store and to retrieve data according to said second protocol, said second protocol includes at least one protocol selected from a group consisting of (a) SCSI protocol, (b) ATA protocol, (c) Firewire protocol, and (d) USB protocol;
a third interface to store and to retrieve data according to said third protocol, said third protocol includes at least one protocol selected from a group consisting of (a) SCSI protocol, (b) ATA protocol, (c) Firewire protocol, and (d) USB protocol;
a controller memory including at least one instruction to support communication with said first persistent memory according to said second protocol and at least one instruction to support communication with said second persistent memory according to said third protocol;
a processor coupled with said first interface, said second interface, and said controller memory, for receiving the identity of said second protocol from said first adapter, and for translating between said first protocol and said second protocol;
a second processor coupled with said first interface, said third interface, and said controller memory, for receiving the identity of said third protocol from said second adapter, and for translating between said first protocol and said third protocol;
a first cable to support communication between said second interface and said first adapter according to at least one protocol selected from a group consisting of (aa) SCSI protocol, (bb) ATA protocol, (cc) Firewire protocol, and (dd) USB protocol; and
a second cable that facilitates communication between said first adapter and said first persistent memory according to said second protocol selected from a group consisting of (aaa) SCSI protocol, (bbb) ATA protocol, (ccc) Firewire protocol, and (ddd) USB protocol,
wherein said first persistent memory forms a response to a request by said computer system, said response including at least one of (A) storing information, (B) retrieving information, and (C) providing status information.

18. The controller system of claim 17, wherein said first cable supports a SCSI interface and protocol, said first cable supports an ATA interface and protocol, and said second cable supports said second interface and protocol selected from a group consisting of (1) SCSI interface and protocol, and (2) ATA interface and protocol.

19. The controller system of claim 17, further including:
at least one second processor coupled between said processor and the second interface to support communication between said first interface and said second interface; and
a second processor memory coupled with said second processor to support communication between said first interface and said second interface according to said second protocol.

20. The controller system of claim 17, wherein said first persistent memory includes at least one memory selected from a group consisting of (1) an ATA disk drive, (2) a SCSI disk drive, (3) a Firewire disk drive, (4) a USB disk drive, (5) a Fibre Channel Arbitrated Loop disk drive, (6) a hard disk drive, (7) solid state memory, and (8) optical storage.

21. A method for use with a computer system to store data, comprising the following steps:
(A) providing a first interface to receive and to send data according to a first protocol having a format useable by the computer system, said first protocol being an Ethernet protocol;
(B) providing a persistent memory to store and to retrieve data according to a second protocol;
(C) providing an adapter functionally coupled to said memory;
(D) providing a second interface to store and to retrieve data according to the second protocol;
(E) providing a common controller coupled between said first interface and said second interface; and
(F) providing a translation function between said first protocol and said second protocol, wherein said translation function is coupled with said common controller, said adapter is coupled to said common controller; and said memory forms a response to a request by said computer system, said response including at least one of (A) storing information, (B) retrieving information, and (C) providing status information.

22. The method of claim 21, wherein
step (B) includes at least one memory selected from a group consisting of (B1) an ATA disk drive, (B2) a SCSI disk drive, (B3) a Firewire disk drive, (B4) a USB disk drive, (B5) a Fibre Channel Arbitrated Loop disk drive, (B6) a hard disk drive, (B7) solid state memory, and (B8) optical storage; and
step (D) includes at least one interface selected from a group consisting of (D1) SCSI bus, (D2) ATA bus, (D3) Firewire bus, and (D4) USB bus.

23. The method of claim 21, wherein step (F) includes providing a first cable coupled between said second interface and said adapter; and providing a second cable coupled between said adapter and said memory.

24. The method of claim 23, wherein step (F) includes coupling said first cable to said second cable to support communication between said second interface and said memory.

25. The method of claim 23, wherein step (F) includes receiving the identity of said second protocol from said adapter.

* * * * *